Aug. 14, 1945.   S. H. EDGE ET AL   2,382,866
STEERING GEAR FOR VEHICLES
Filed Dec. 22, 1942   8 Sheets-Sheet 6

Inventor
Stanley Howard Edge
Erwin Turnlow
By
Attorneys

Aug. 14, 1945.  S. H. EDGE ET AL  2,382,866
STEERING GEAR FOR VEHICLES
Filed Dec. 22, 1942  8 Sheets-Sheet 7

Inventor
Stanley Howard Edge
By Edwin Townslow
Norris C. Bateman
Attorneys.

Patented Aug. 14, 1945

2,382,866

UNITED STATES PATENT OFFICE 2,382,866

STEERING GEAR FOR VEHICLES

Stanley Howard Edge and Edwin Twemlow,
Lincoln, England

Application December 22, 1942, Serial No. 469,846
In Great Britain October 20, 1941

6 Claims. (Cl. 60—97)

This invention relates to means for steering vehicles and has particular reference to the steering gear of endless track vehicles such as armored fighting vehicles.

The object of the present invention is to provide an improved construction or arrangement capable of operation by a single hand lever or by one of a pair of hand levers (or pedals) and adapted to utilise the power available in a continuously flowing hydraulic circuit to actuate servo devices by means of which operation of clutches and/or application of brakes is effected.

According to the invention means for steering vehicles is provided characterised by the provision of a pair of servo cylinders connected in a hydraulic circuit and hand actuating means adapted to operate valve devices to cause liquid under pressure to flow to one or both of said cylinders and to interrupt the hydraulic circuit partially or completely to cause the liquid under pressure to operate the piston in the selected cylinder whose movements are transmitted to brake or like mechanism under control.

According to the preferred form of the invention the improved means for steering vehicles includes a pair of servo cylinders, a valve housing, a liquid reservoir, a pump for circulating liquid through said housing and cylinders and back to the reservoir and hand controlled means adapted when actuated first to close a shut-off valve to divert the flow of liquid to one only of said cylinders and secondly to operate one of a pair of valve devices to close partially or completely the liquid return from either of said cylinders and thereby cause an increase of pressure to operate the piston in the selected cylinder whose movements are transmitted to the brake or like mechanism under control.

Reference will now be made to the accompanying drawings which illustrate examples of steering devices constructed according to the invention and in which—

Fig. 3a is a detail view of part of the mechanism shown in Fig. 3,

Figure 7:
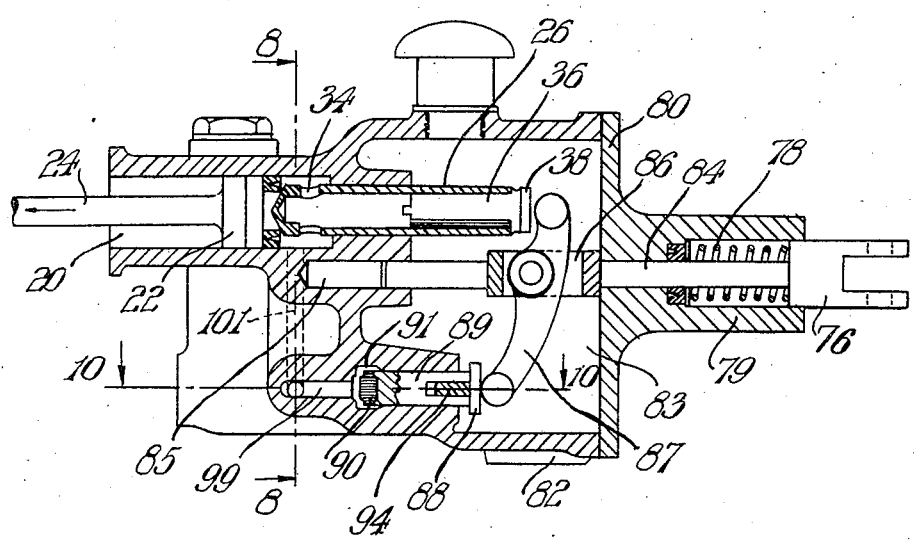
Figure 9:
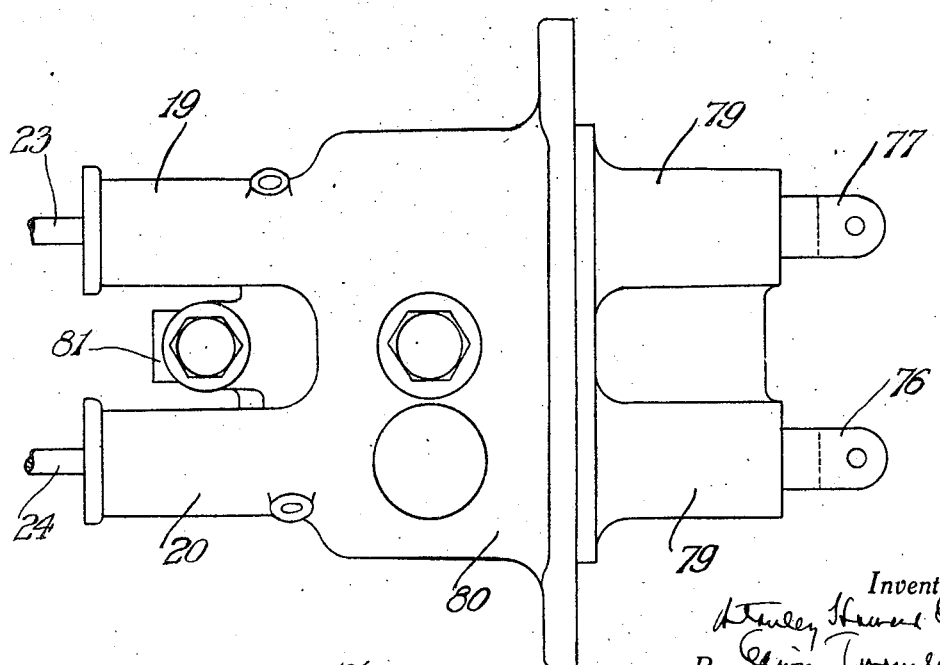
Figure 8:
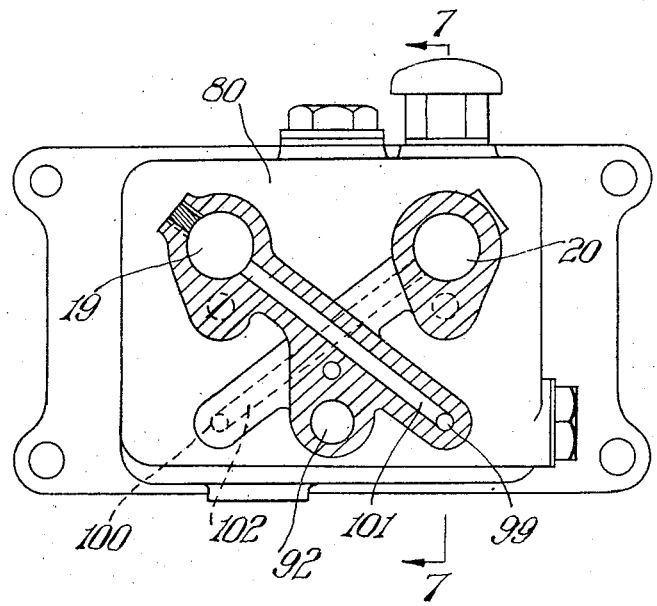
Figure 10:
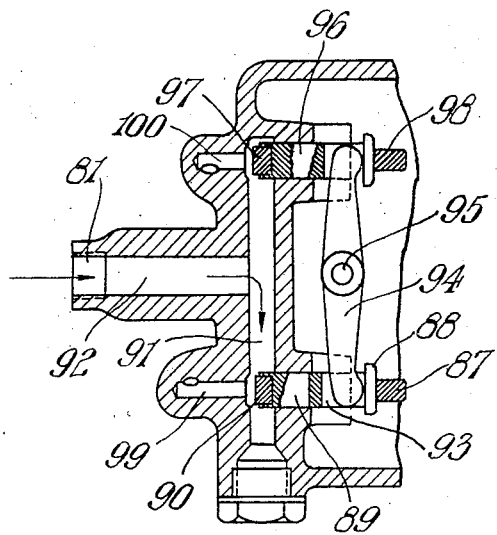

Fig. 7 is a sectional elevation of a control valve taken on the line 7—7 of Fig. 8, Fig. 8 is a cross-sectional elevation of the valve taken on the line 8—8 of Fig. 7, Fig. 9 is a plan of the valve shown in Figs. 7 and 8 and Fig. 10 is a detail sectional plan taken on the line 10—10 of Fig. 7.

Figure 1:
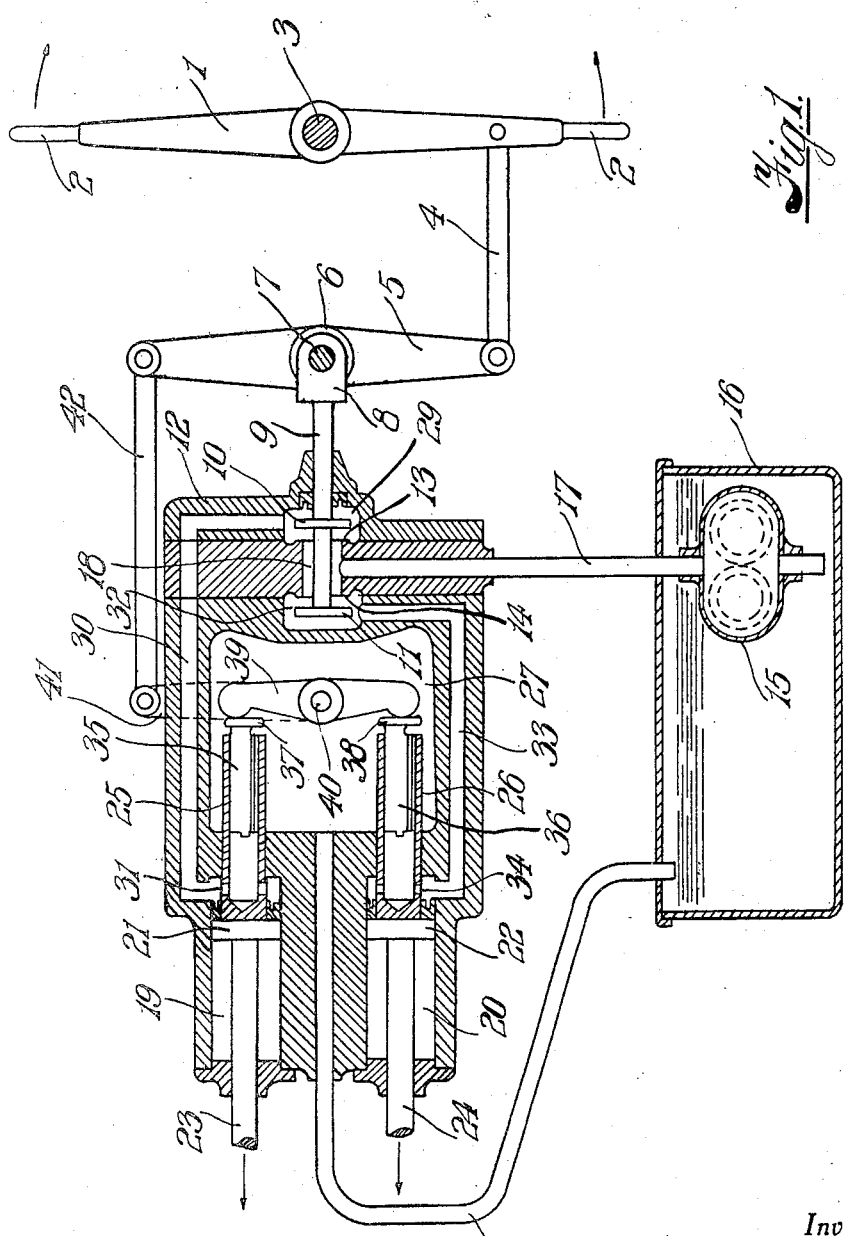
Fig. 1 is a diagram of a control apparatus employing a single operating handle.
Figure 2:
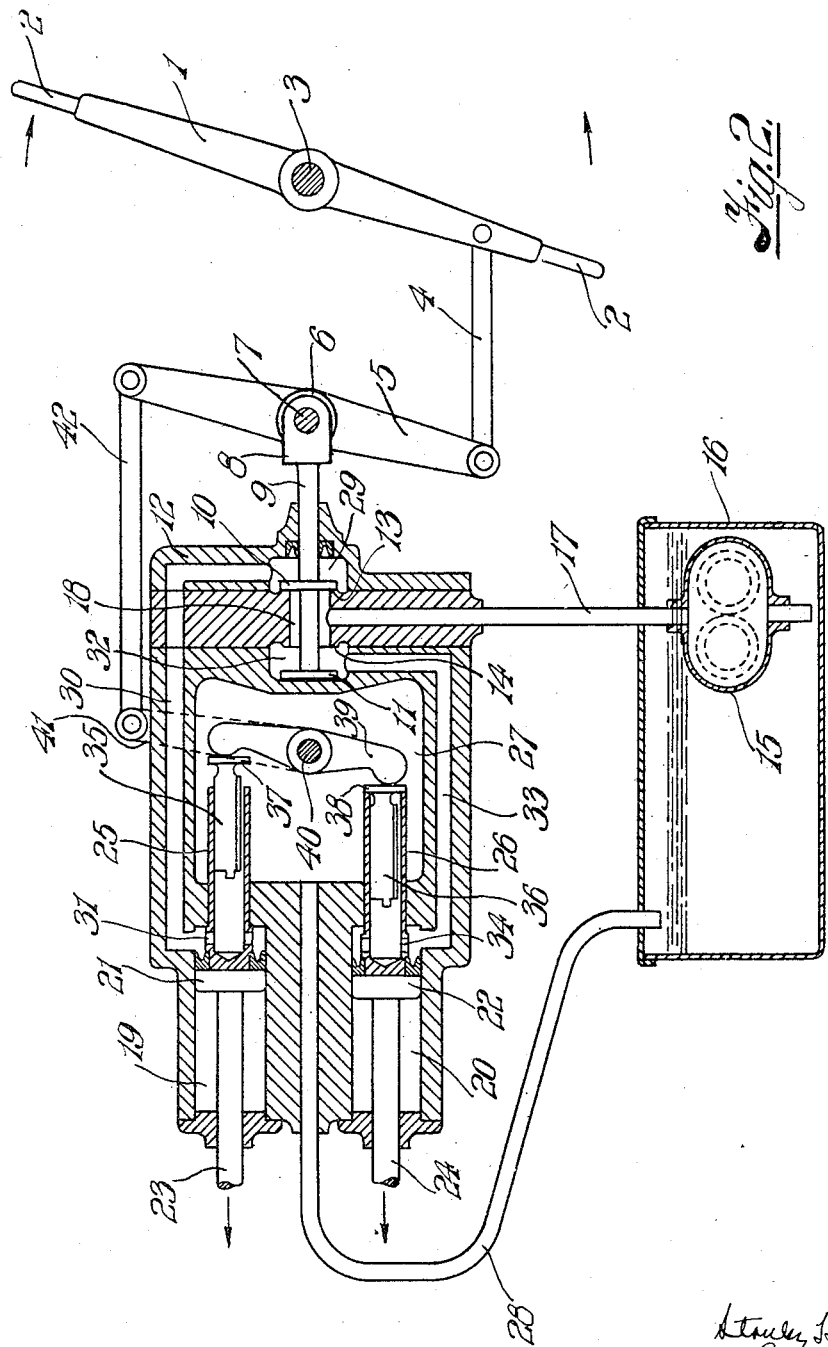
Fig. 2 is a diagram similar to Fig. 1 showing an operative position.

Referring first to Figs. 1 and 2 of the drawings, the steering gear control apparatus comprises an operating lever 1 having handles 2 at its ends and movable about a fixed pivot 3. Near one end the lever 1 is connected by a pivoted link 4 to a rocking lever 5 having a central boss 6 disposed within a fork end 8 of a rod 9 and pivotally connected thereto by a pin 7. The rod 9 carries at its opposite end a double acting valve device, hereinafter called the shut-off valve, comprising a pair of valve members 10 and 11 movable axially in a valve housing 12 in which they can occupy positions wherein both of them are off their seatings 13 and 14 as shown in Fig. 1 or wherein either of them is in contact with a seating as hereinafter described.

The valve housing 12 is connected to a pump 15 disposed in a reservoir 16 for liquid, preferably oil, the pump delivery conduit 17 being connected to a passage 18 within the housing 12 and connecting the two valve seatings 13 and 14. The housing 12 is also constructed to include two servo cylinders 19 and 20, the pistons 21 and 22 in which are connected through their rods 23 and 24 to the brake or other mechanism which is under control. The pistons 21 and 22 are also provided on their sides remote from the rods 23 and 24 with hollow rods 25 and 26 respectively both of which extend into a chamber 27, within the housing 12, from which the liquid delivered to the housing from the pump 15 returns through a conduit 28 to the reservoir 16.

When the parts are in the positions shown in Fig. 1, the hydraulic circuit actuated by the pump 15 flows uninterruptedly and no output work is done, the liquid from the pump delivery 17 flowing into the passage 18 and from thence in one direction through a valve chamber 29, passage 30, cylinder 19, ports 31 in piston rod 25 and through the hollow piston rod to the chamber 27. Liquid also flows in another direction from passage 18 through a valve housing 32, passage 33, cylinder 20, ports 34 in piston rod 26 through which it enters the chamber 27 from which the liquid returns to the reservoir by way of the conduit 28 as already described.

Within the hollow piston rods 25 and 26 are mounted cylindrical valve members 35 and 36 which have grooved or fluted surfaces and heads 37 and 38 each of larger diameter than the interior of the piston rod with which it co-operates. When in the positions shown in Fig. 1 liquid can flow past these valves into the chamber 27 owing to the fluted surfaces of the valves and to the disengagement of the heads 37 and 38 from their seatings. The heads 37 and 38 of the valves are engaged by a rocking arm 39 movable around a fixed pivot 40, the pivot extending to the exterior of the housing 12 where it carries an arm 41 connected by a link 42 with that end of the lever 5 which is remote from the connection to the link 4.

In the operation of the arrangement shown in Fig. 1, rocking movement imparted to the handle 1 in either direction indicated by the two arrows is transmitted to the rocking lever 5 whose movement is first transmitted to the rod 9 to seat one of the valves 10 or 11 and thus divert the liquid delivered from the pump through one or other of the passages 30 or 33 to one of the servo cylinders 19 or 20. The fork end 8 of rod 9 being pivotally connected to boss 6 enables rocking arm 5 to pivot about pin 7, and the movement of arm 5 is transmitted to the shaft 40 so that the arm 39 is rocked to move one of the valve heads 37 or 38 towards its seat on the end of its hollow piston rod and thereby restrict and ultimately prevent circulation of liquid through that rod. One of these operative positions is shown in Fig. 2 wherein valve member 10 is seated so that the pump 15 is delivering liquid through passage 18 and passage 33 to cylinder 20, the valve head 38 being seated on the end of hollow piston rod 26. As the valve member 10 is closed no liquid can reach the chamber 27 and consequently the entire pump delivery goes to cylinder 20. The pressure thus set up in the passage 33 and cylinder 20 forces the piston 22 outwards in the direction of the arrow so that movement is transmitted to actuate the brakes or the like on one side of the vehicle and cause a turning movement. It will be understood that Fig. 2 illustrates an extreme position wherein full pressure is concentrated on piston 22 and that operation can be caused by a partial closure of either valve 37 or 38 to restrict liquid flow and thereby increase the pressure in the selected cylinder. Should the handle 1 be rocked in the direction opposite to that shown in Fig. 2 the piston valve 11 will be seated and the pump delivery diverted through passage 30 to actuate the servo piston 21 in the manner already described.

Figure 3:
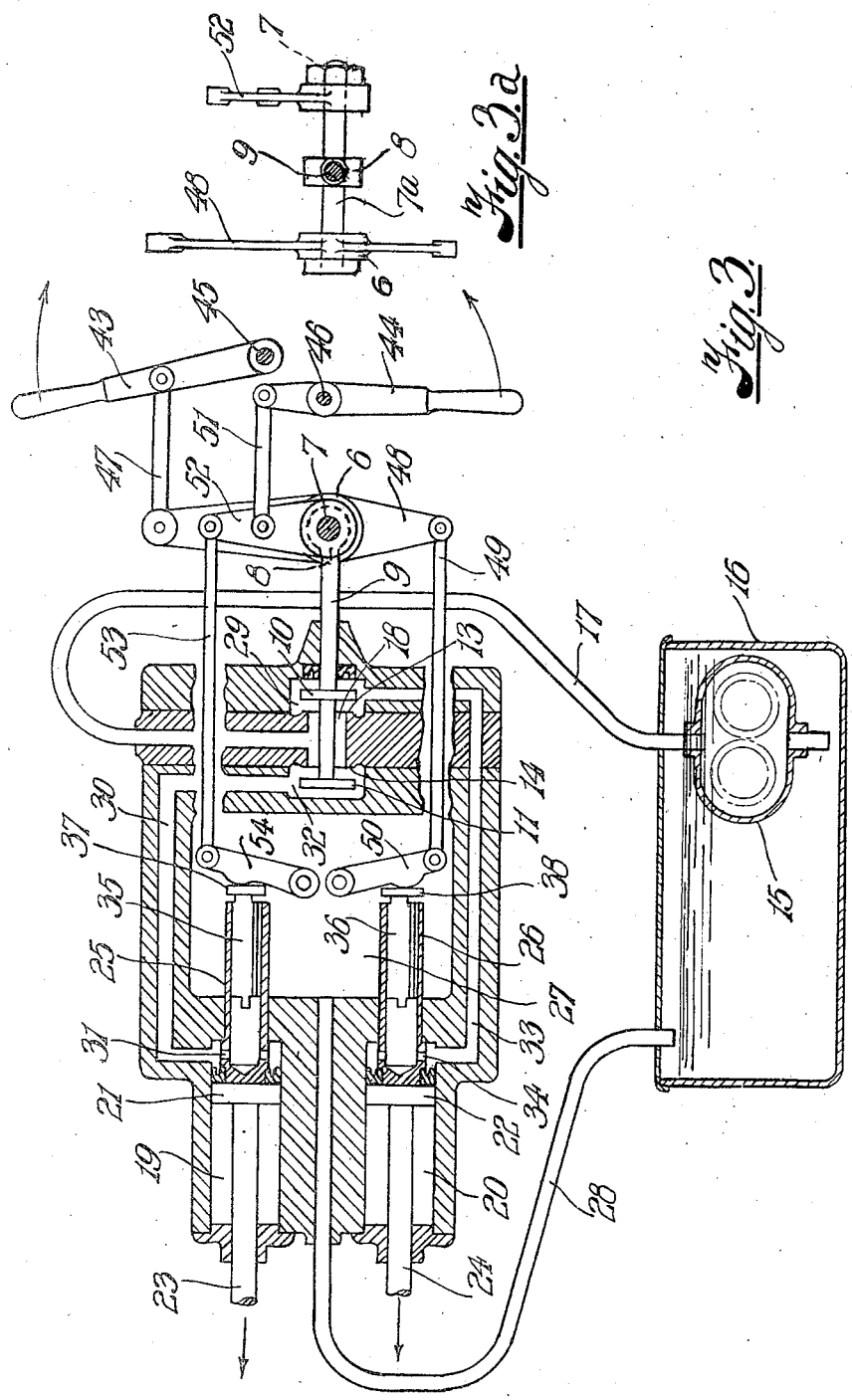
Fig. 3 is a diagram of an apparatus employing two handled control.
Figure 4:
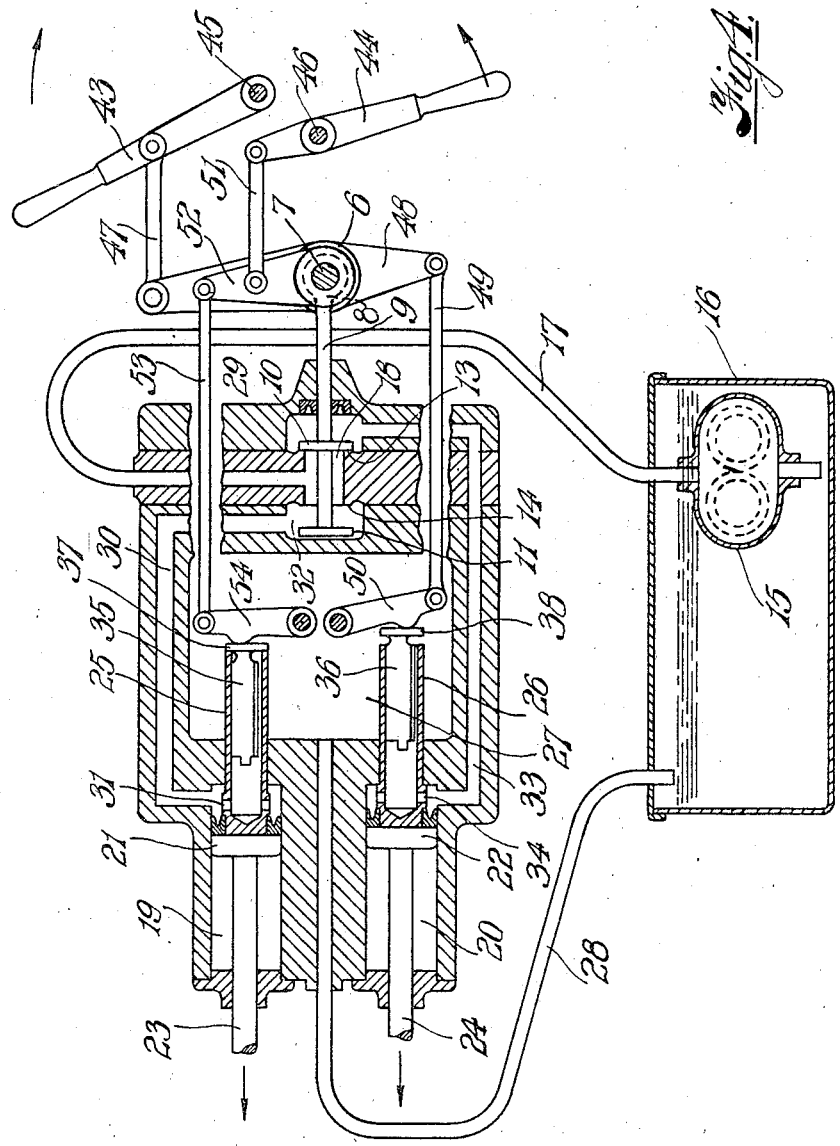
Fig. 4 shows an operative position of the apparatus shown in Fig. 3.

In the modification illustrated in Figs. 3 and 4, components similar in construction to those shown in Figs. 1 and 2 are indicated by corresponding reference numerals. The principal modification consists in the employment of two operating handles 43 and 44 movable respectively about the fixed pivots 45 and 46. The handle 43 is connected by link 47 with one end of a rocking lever 48 whose other end is connected by link 49 with a rocking arm 50 which is adapted to actuate the valve head 38. The second handle 44 is connected by link 51 to an arm 52 mounted co-axially with lever 48 and connected by a link 53 with a rocking arm 54 adapted to actuate valve head 37, both arm 48 and arm 52 being pivotally connected with the end of rod 9 by pivot pin 7 as in Fig. 1 so that movement of either of them shifts the shut-off valve 10—11 and operates one or other of the rocking arms 50 or 54 according to the direction of turning required. To enable the rod 9 to be moved in opposite directions according to whether handle 43 or 44 is operated, the arms 48 and 52 are pivotally mounted on pin 7 (see Fig. 3a).

In operation, rocking movement applied to handle 43 in the direction of the arrow, exerts a pull on link 47 to rock arm 48 in a clockwise direction which is transmitted to end 8 of rod 9 to close valve 11, after which link 49 is moved to seat valve 38. Liquid then flows through passage 33 to operate piston 22.

When rocking movement is imparted to handle 44 in the direction of the arrow a push is exerted on arm 52 which is thereby rocked in an anti-clockwise direction to push rod 9 and close valve 10. Link 53 is also moved in the direction to close the valve 37 and thereby divert the flow of liquid through passage 30 to operate the piston 21 in cylinder 19. The positions of the parts are then as shown in Fig. 4.

If on the other hand both handles 43 and 44 are operated simultaneously to exert a push on link 51 and a pull on link 47, the pivot pin 7 remains stationary and valves 10 and 11 remain inoperative. The arms 52 and 48 swivel slightly on the pin 7 and cause both valves 37 and 38 to close so that both cylinders 19 and 20 receive supplies of fluid and both pistons are operated.

Figure 5:
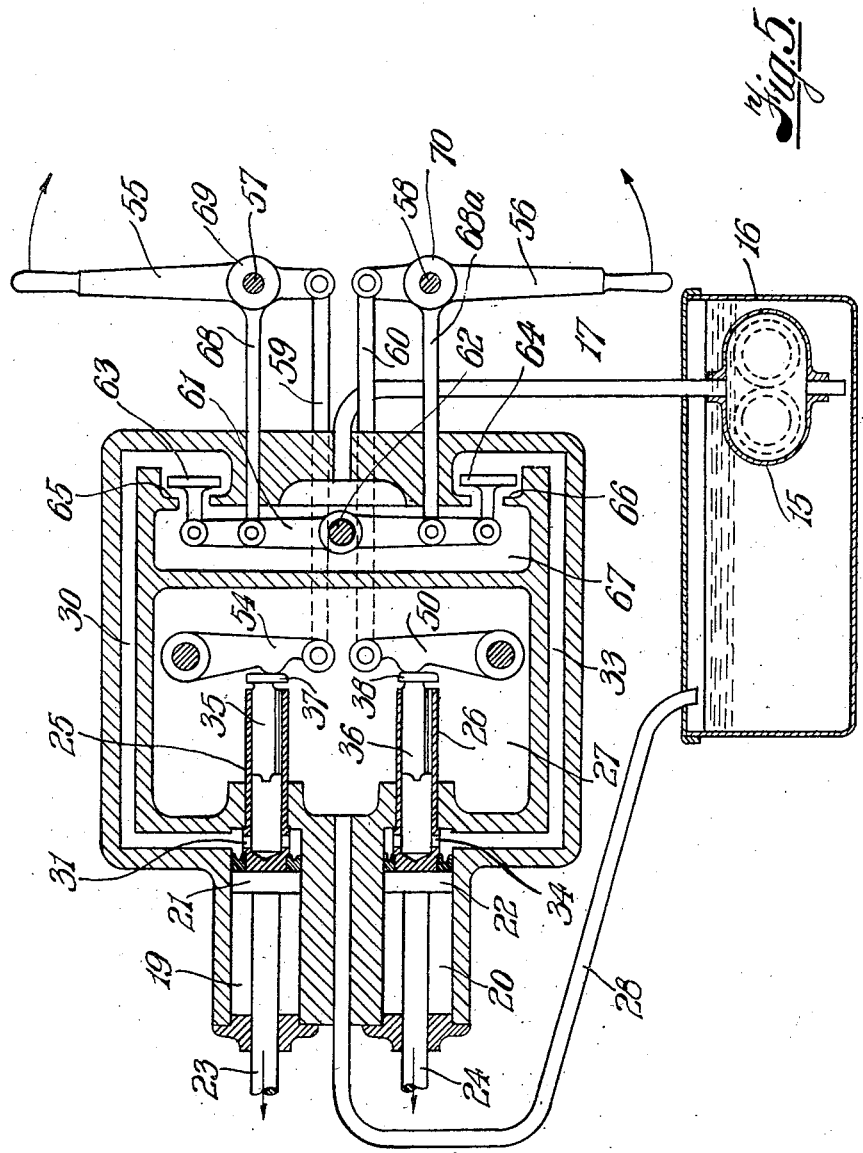
Fig. 5 is a diagram of another form of two handled control apparatus.
Figure 6:
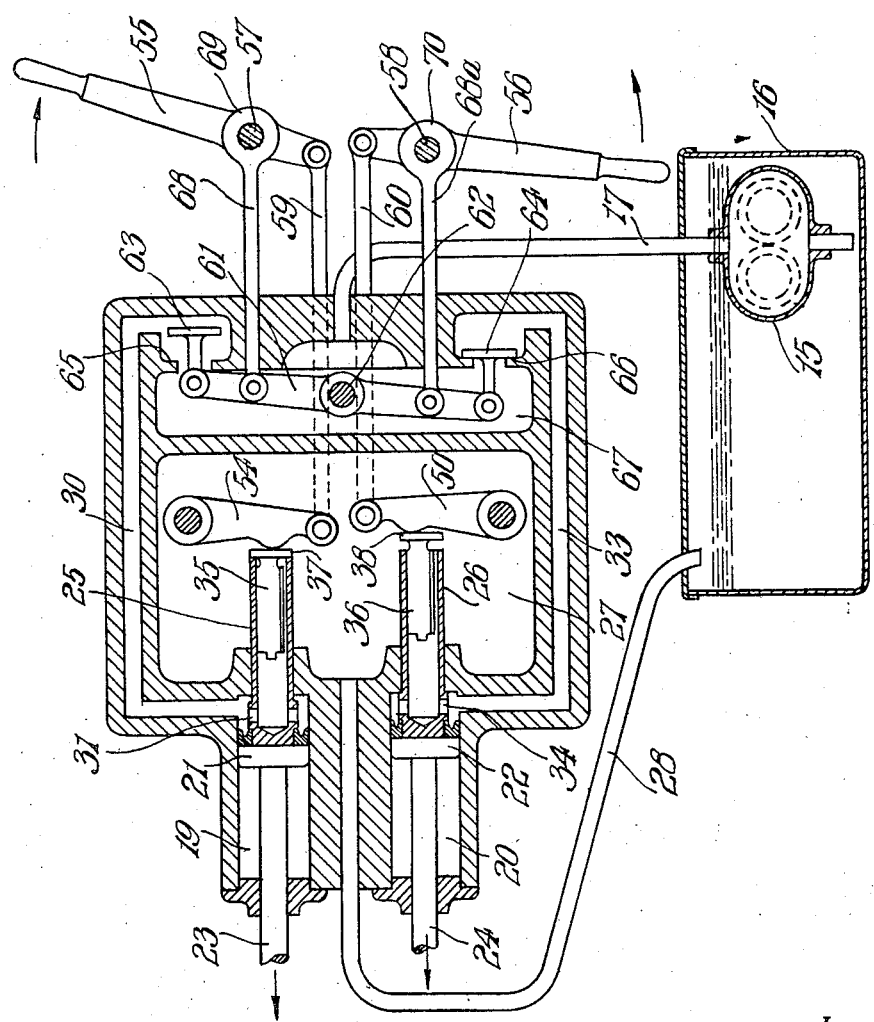
Fig. 6 shows an operative position of the apparatus shown in Fig. 5.

In the arrangement shown in Figs. 5 and 6, each of two handles 55 and 56 is pivotally connected by pins 57 and 58 to links 68 and 68ª respectively whose other ends are connected to valve arm 61. The handles are linked at their ends remote from the free ends by rods 59 and 60 to the rocking arms 50 and 54 whose arrangement and mode of operation is similar to that of those shown in Figs. 3 and 4. In the present arrangement, the shut-off valve includes an arm 61 movable about a central fixed pivot 62 and carrying valve members 63 and 64 at its ends, these valve members co-operating respectively with fixed seatings 65 and 66 by which a delivery chamber 67 communicates with the passages 30 and 33. The delivery conduit 17 of the pump also communicates with the chamber 67. The chamber 27 communicates, as in previous examples, by conduit 28 with the reservoir 16.

In operation movement of one of the handles 55 or 56 rocks the arm 61 and first causes one of the valves 63 or 64 to close. In Fig. 6, the handle 55 has been operated so that valve 64 is seated when pivotal movement of the handle begins which is transmitted through rod 59 to exert pressure on the rocking arm 54 to move valve head 37 towards its seating on the end of tubular piston rod 25 and thereby cause pressure to be exerted on the servo piston 21 to actuate brakes or other components.

The control valve shown in Figs. 7–10 is designed for operation from a remote position, the effort being transmitted either to a plunger 76 or a plunger 77 according to the direction in which a vehicle or the like is to be steered. Each of these plungers is movable against the action of a spring 78 disposed in a sleeve 79 forming part of or attached to a valve housing 80 which has a connection 81 for a delivery conduit from an oil pump and a connection 82 to which the return conduit is attached for discharge to the oil reservoir from a chamber 83 within the housing. The plunger 76 is attached to a rod 84 whose inner end is slidably mounted in a socket 85 formed within the housing 80 and the rod has a slotted portion 86 within which is mounted a rocking arm 87 whose upper end is adapted to engage the head 38 of a valve member 36 constructed and arranged in the manner described with reference to Figs. 1 to 6. The lower end of the rocking arm 87 engages the head 88 of a plunger 89 whose opposite end carries a valve member 90 movable within a transverse passage 91 in permanent communication with the oil inlet passage 92. The plunger 89 is slotted at 93 to receive one end of an arm 94 movable about a fixed pivot 95 whose other end engages a second plunger 96 also carrying a valve member 97 at one end, this plunger being operated by a second rocking arm 98 actuated by the plunger 77 through a slidable rod similar to the rod 84. The arm 94 and the plungers 89 and 96 with their valve members 90 and 97 constitute the shut-off valve, either valve member 90 or 97 being seated as soon as the device is operated. Adjacent the ends of the passage 91 are two short passages 99 and 100 extending at right angles to the passage 91 (see Fig. 10) and communicating respectively by inclined passages 101 and 102 (see Fig. 8) with the servo cylinders 19 and 20 respectively.

In the operation of the device shown in Figs. 7-10, the valves 90 and 97 take the place of the double piston valve 10, 11 shown in Fig. 1, and when the plunger 76 is operated, for example, its movement is transmitted to the rocking arm 87 which bears upon the plunger 89 to seat the valve 90. By these means the communication to inclined passage 101 is closed and no fluid passes thereafter through the piston rod 25. The seating of valve 90 and concurrent movement of plunger 89 imparts a rocking movement to the arm 94 to maintain valve 97 open so that liquid can pass by the inclined passage 100 into servo cylinder 20. The rocking arm 87 having by its continued movement also seated the valve 38, the pressure becomes effective in cylinder 20 to push the piston 22 outwards and transmit movement to the brake or other device which is under control. When the applied effort on the plunger 76 is relaxed the pressure within the system assisted by the spring 78 restores the parts to the inoperative positions shown in the drawings. When effort is applied to plunger 77 the operation is similar to that already described. Valve 97 will be seated, valve 90 held open, valve 37 seated and liquid will pass through the passage 101 to servo cylinder 19 to actuate piston 21.

The invention finds a useful application to the steering of endless track vehicles in which the employment of any of the arrangements described herein enables the turning movements of the vehicle to be very simply controlled as the initial movement of the handle 1 or of either handle in any of the two handled arrangements can be utilised to cause disengagement of a clutch and the subsequent movement to apply a graduated pressure to the brake control which causes a retardation in speed to be produced in the endless track at one side of the vehicle whereby a gradual turning movement of the vehicle to right or left results. This gradual retardation is caused by the movement of the rocking arms such as shown at 39 (Fig. 1) and 50, 54 (Fig. 3) partially closing the return path of the circulating oil and subsequently completely closing it by the movement of a valve head 37 or 38 towards and finally onto its seating on the end of one of the tubular piston rods 25 or 26. Alternatively, by a sudden movement of the steering handle or of either handle to full pressure position, that is to seat one of the valve heads 37 or 38 immediately, a sharp right-angle turn in either direction can be effected.

In all forms of the invention, the operation of both handles simultaneously can be used to effect a retardation in speed and ultimately full braking to bring the vehicle to a standstill.

In all forms of the invention, the valves 35 and 36 function as reaction valves while the shut-off device is in each case connected to a beam (5 in Figs. 1 and 2) which is also connected to the manual control device and to the reaction valve. In operation, the movement of the manual control device causes the shut-off valve to close the liquid circuit to the reaction valve which is not required and the beam then takes as its fulcrum its pivotal connection to the shut-off valve which connection occupies a fixed position after operation of the shut-off valve. The movement of the beam, thereafter, operates the selected reaction valve to control the pressure applied thereto and, depending on the manual force applied at the control lever, the reaction valve will function in a known manner and build up pressure in the conduit supplying the servo cylinder.

We claim:

1. Means for steering vehicles, including a pair of servo cylinders having pistons therein, a valve housing, a liquid reservoir, a pump and passsages for circulating liquid through said housing and cylinders and for return from said cylinders to the reservoir, a double acting shut-off valve adapted when actuated to continue the flow of liquid to one servo cylinder and to shut off liquid flow to the other cylinder, hand controlled means for actuating said valve, a pair of reaction valve devices disposed in said housing and cooperative with the return passages from the respective cylinders to control the return of liquid therefrom, and mechanism connected to said hand controlled means for operating said shut-off valve to divert the flow of liquid to a selected one only of said cylinders and thereafter to operate the reaction valve device for the selected one of said cylinders to close partially or completely the return passage for liquid from the selected one of said servo cylinders and thereby cause an increase of pressure to operate the piston in the selected cylinder for transmission of movement thereof to the mechanism under control.

2. Means for steering vehicles, including a pair of servo cylinders and pistons therein having ported extensions, a valve housing, a liquid reservoir, a pump and passages forming a circuit for circulating liquid through said housing and cylinders and ported extensions and for return to the reservoir, a shut-off valve chamber connected in the liquid circuit within said housing, double acting shut-off valve elements disposed in said chamber and normally positioned to permit flow to both cylinders, a pair of valve devices disposed in the ported extensions of said pistons, and hand controlled means adapted first to actuate the shut-off valve elements to divert the flow of liquid to one only of said cylinders and thereafter to operate one of said valve devices to close partially or completely the liquid return from said one of said cylinders and thereby cause an increase of pressure to operate the piston in the selected cylinder for transmission of movement thereof to the mechanism under control.

3. Means for steering vehicles according to claim 2, wherein said valve devices are reaction valves, and said hand controlled means comprises a beam connected to said shut-off valve and to a manual control device and one of said reaction valves to control the amount of pressure in one of said servo cylinders whereby the effort applied to the manual control device causes the shut-off valve to close the liquid circuit to the reaction valve which is not required, the beam thereafter taking as its fulcrum the operative end of the shut-off valve to control the pressure applied to the selected reaction valve which causes pressure to be built up in the selected servo cylinder in proportion to the manual force exerted on the manual control device.

4. Means for steering vehicles according to claim 2, wherein means are provided to prevent operation of said shut-off valve when both valves controlling the liquid return from the servo cylinders are simultaneously operated.

5. Means for steering vehicles, including a housing having a valve chamber therein, a liquid reservoir connected to said housing, a pair of servo cylinders disposed in said housing, pistons in said cylinders adapted to be connected to the mechanism under control, ported sleeve extensions of said pistons, valve elements slidable in said extensions, a pump for circulating liquid through said housing, valve chamber, cylinders, ported extensions and reservoir, double acting shut-off valve devices disposed in said valve chamber and adapted, in neutral position, to permit flow from the pump to both cylinders, hand operated means for first actuating said shut-off valve devices in either direction from neutral position to prevent flow from the pump to either cylinder, said hand operated means being then operable to close the valve element of the cylinder which is still receiving liquid from the pump.

6. Means for steering vehicles, including a housing, a liquid reservoir connected to said housing, a pair of servo cylinders disposed in said housing, pistons in said cylinders adapted to be connected to the mechanism under control, a valve chamber, ported sleeves extending from said pistons into said valve chamber, valve elements slidably mounted in said sleeves, rocking mechanism adapted to actuate either of said valve elements, a pump for circulating liquid through said housing, cylinders, ported extensions, valve elements, valve chambers and reservoir, a double acting shut-off valve mechanism adapted to divert liquid from the delivery of said pump to either of said servo cylinders, and hand operated means for first actuating said shut-off valve and for thereafter operating said rocking mechanism to close one of said valve elements to interrupt the return of liquid from one of said servo cylinders.

STANLEY HOWARD EDGE.
EDWIN TWEMLOW.